(12) United States Patent
Dziak et al.

(10) Patent No.: US 8,811,136 B2
(45) Date of Patent: Aug. 19, 2014

(54) HARMONIC RATIO BASED DEFECT CLASSIFIER

(71) Applicant: LSI Corporation, Milpitas, CA (US)

(72) Inventors: Scott M. Dziak, Fort Collins, CO (US); Ming Jin, Fremont, CA (US); Jonathan Dykhuis, Firestone, CO (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 13/680,497

(22) Filed: Nov. 19, 2012

(65) Prior Publication Data

US 2014/0140182 A1    May 22, 2014

(51) Int. Cl.
G11B 7/00 (2006.01)
G11B 27/36 (2006.01)

(52) U.S. Cl.
CPC ................................ G11B 27/36 (2013.01)
USPC ........................................ 369/53.15

(58) Field of Classification Search
None
See application file for complete search history.

(56) References Cited

U.S. PATENT DOCUMENTS

| | | | | |
|---|---|---|---|---|
| 5,715,222 A * | 2/1998 | Senshu et al. | | 369/47.28 |
| 6,310,739 B1 * | 10/2001 | McEwen et al. | | 360/25 |
| 6,384,995 B1 * | 5/2002 | Smith | | 360/31 |
| 6,407,874 B1 * | 6/2002 | Smith et al. | | 360/25 |
| 6,482,505 B1 * | 11/2002 | Bertero et al. | | 428/212 |
| 6,697,516 B1 * | 2/2004 | Alexandre | | 382/149 |
| 7,139,145 B1 * | 11/2006 | Archibald et al. | | 360/53 |
| 7,218,768 B2 * | 5/2007 | Evans et al. | | 382/141 |
| 7,369,340 B1 * | 5/2008 | Dang et al. | | 360/31 |
| 7,855,806 B2 * | 12/2010 | Paul et al. | | 358/1.9 |
| 8,285,498 B2 * | 10/2012 | Saarinen et al. | | 702/56 |
| 2002/0109110 A1 * | 8/2002 | Some et al. | | 250/559.4 |
| 2003/0085701 A1 * | 5/2003 | Baumgartner et al. | | 324/212 |
| 2004/0061966 A1 * | 4/2004 | Berger et al. | | 360/73.03 |
| 2008/0262643 A1 * | 10/2008 | Creigh et al. | | 700/110 |
| 2009/0244750 A1 * | 10/2009 | Shibano | | 360/25 |
| 2009/0279079 A1 * | 11/2009 | Shibata et al. | | 356/237.3 |
| 2012/0186349 A1 * | 7/2012 | Inoue | | 73/600 |
| 2013/0077086 A1 * | 3/2013 | Chuang et al. | | 356/51 |

FOREIGN PATENT DOCUMENTS

| | | | |
|---|---|---|---|
| EP | 2362395 A2 | | 8/2011 |
| JP | 2004074414 A | * | 3/2004 |
| JP | 2004340807 A | * | 12/2004 |
| KR | 20080083523 A | | 9/2008 |

* cited by examiner

*Primary Examiner* — Peter Agustin
(74) *Attorney, Agent, or Firm* — Suiter Swantz pc llo

(57) ABSTRACT

The disclosure is directed to a system and method for detecting and classifying at least one media defect. A periodic pattern is written to a medium to yield at least one waveform. The magnitude of the waveform is compared against a defect threshold to detect the presence or absence of media defects in the medium. When at least one defect is detected, a magnitude for each of at least two harmonics of the waveform is determined in the defect range. The defect is classified by comparing a ratio of the magnitudes of the at least two harmonics against a classification threshold.

12 Claims, 5 Drawing Sheets

HARMONIC RATIO BASED DEFECT CLASSIFIER

BACKGROUND

Data can be stored on several types of carrier media, such as hard disk drives, optical disks, and other forms of permanent or semi-permanent storage. Defects in carrier media result in unreliable behavior, poor performance, or data corruption. Testing for media defects can improve reliability in data storage systems.

SUMMARY

An embodiment of the disclosure is a method of detecting and classifying at least one media defect. A periodic pattern is written to a medium to yield at least one waveform. The magnitude of the waveform is compared against a defect threshold to detect the presence or absence of media defects in the medium. When at least one defect is detected, a magnitude for each of at least two harmonics of the waveform is determined in the defect range. The magnitudes of the at least two harmonics are utilized to classify the defect.

It is to be understood that both the foregoing general description and the following detailed description are not necessarily restrictive of the disclosure. The accompanying drawings, which are incorporated in and constitute a part of the specification, illustrate embodiments of the disclosure.

BRIEF DESCRIPTION OF THE DRAWINGS

The embodiments of the disclosure may be better understood by those skilled in the art by reference to the accompanying figures in which.

DETAILED DESCRIPTION

Reference will now be made in detail to the embodiments disclosed, which are illustrated in the accompanying drawings.

FIGS. 1A through 3 illustrate embodiments of a system and method for detecting and classifying at least one media defect. Defects including, but not limited to, thermal asperity (TA) and delaminated (DLM) defects are known to occur in carrier media such as hard disk drives and other permanent or semi-permanent storage devices. The term "test medium" is used throughout the disclosure to reference any carrier medium being operated upon by a system or method embodied herein.

Figure 1A:
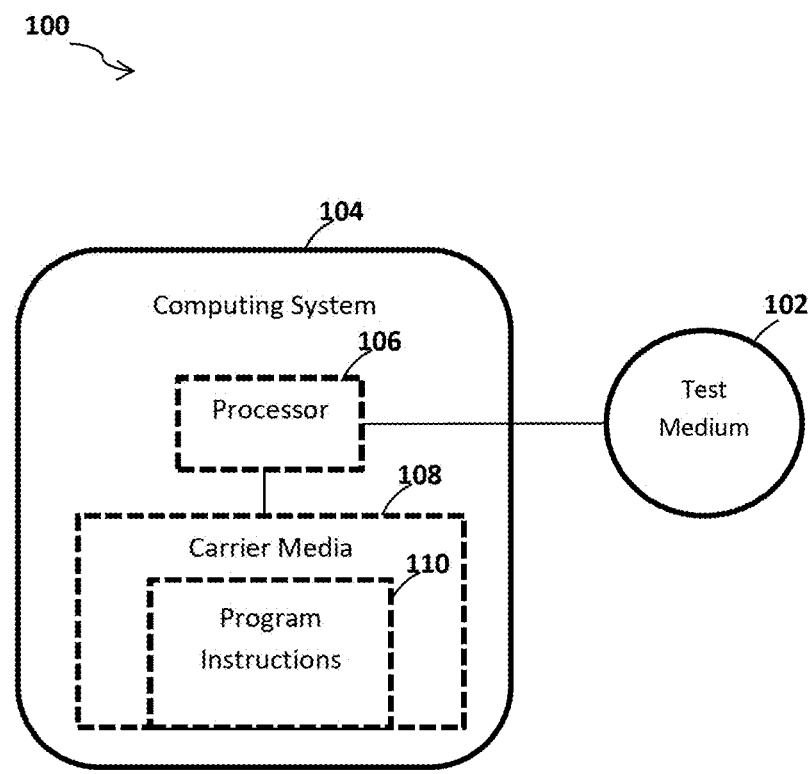
FIG. 1A is a block diagram illustrating a system for detecting and classifying at least one media defect, in accordance with an embodiment of the disclosure.

FIG. 1A illustrates an embodiment of a system 100 for detecting and classifying at least one defect of at least one test medium 102. The system 100 includes a computing system 104 in communication with the test medium 102. The computing system 104 includes any combination of hardware, software, or firmware configured for executing one or more steps described herein for detecting and classifying at least one defect of the test medium 102. In an embodiment, the computing system 104 includes at least one processor 106 configured for executing program instructions 110 from carrier media 108 to complete one or more of the steps described herein. In another embodiment, the computing system 104 includes an electronic circuit configured for completing one or more of the steps described herein.

Figure 1B:
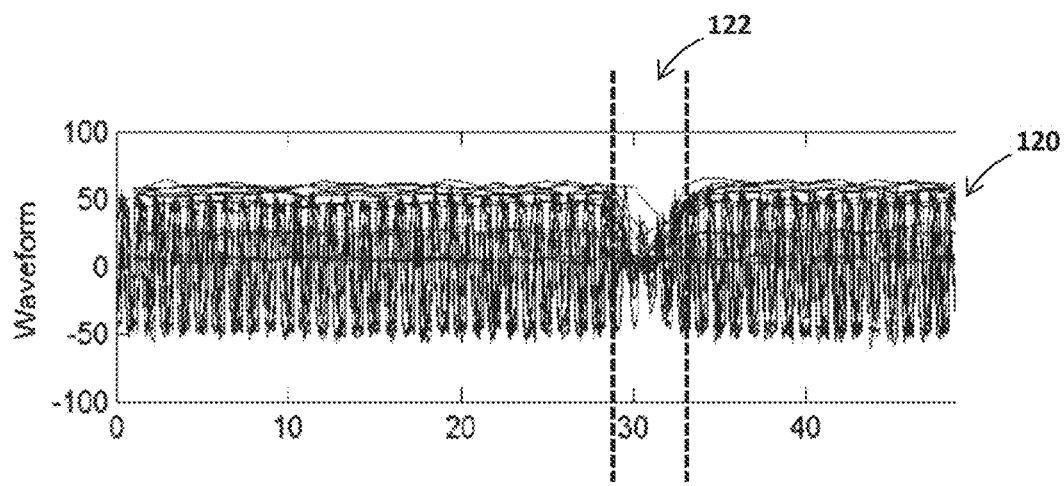
FIG. 1B is a graphical illustration of a waveform generated by writing a periodic pattern to a medium, in accordance with an embodiment of the disclosure.

The computing system 104 is configured for writing a periodic pattern to the test medium 102 to generate a waveform 120, as illustrated in FIG. 1B. In some embodiments, the periodic pattern includes, but is not limited to, a 4T pattern. The computing system 104 is further configured for comparing the waveform 102 to a defect threshold to determine the presence or absence of media defects. The defect threshold is a selected value or a predetermined value. In some embodiments, the defect threshold is related to the type of test medium 102. In an embodiment, the computing system 104 detects at least one defect when a magnitude of the waveform 120 is below the defect threshold. A defect range 122 includes a portion of the waveform 120 affected by the defect, such as an attenuated portion of the waveform 120 or a portion of the waveform 120 having lower amplitude than the remainder of the waveform 120.

The computing system 104 is further configured for classifying the detected defect utilizing at least two harmonics of the waveform 120. In some embodiments, the two harmonics include, but are not limited to, a first harmonic and a third harmonic of the waveform 120. A harmonic is a component of the waveform 120 that has a frequency that is an integer multiple of the fundamental frequency. Accordingly, the first harmonic is a component of the waveform 120 at the fundamental frequency and the third harmonic is a component of the waveform 120 at three times the fundamental frequency, and so on.

Figure 1C:
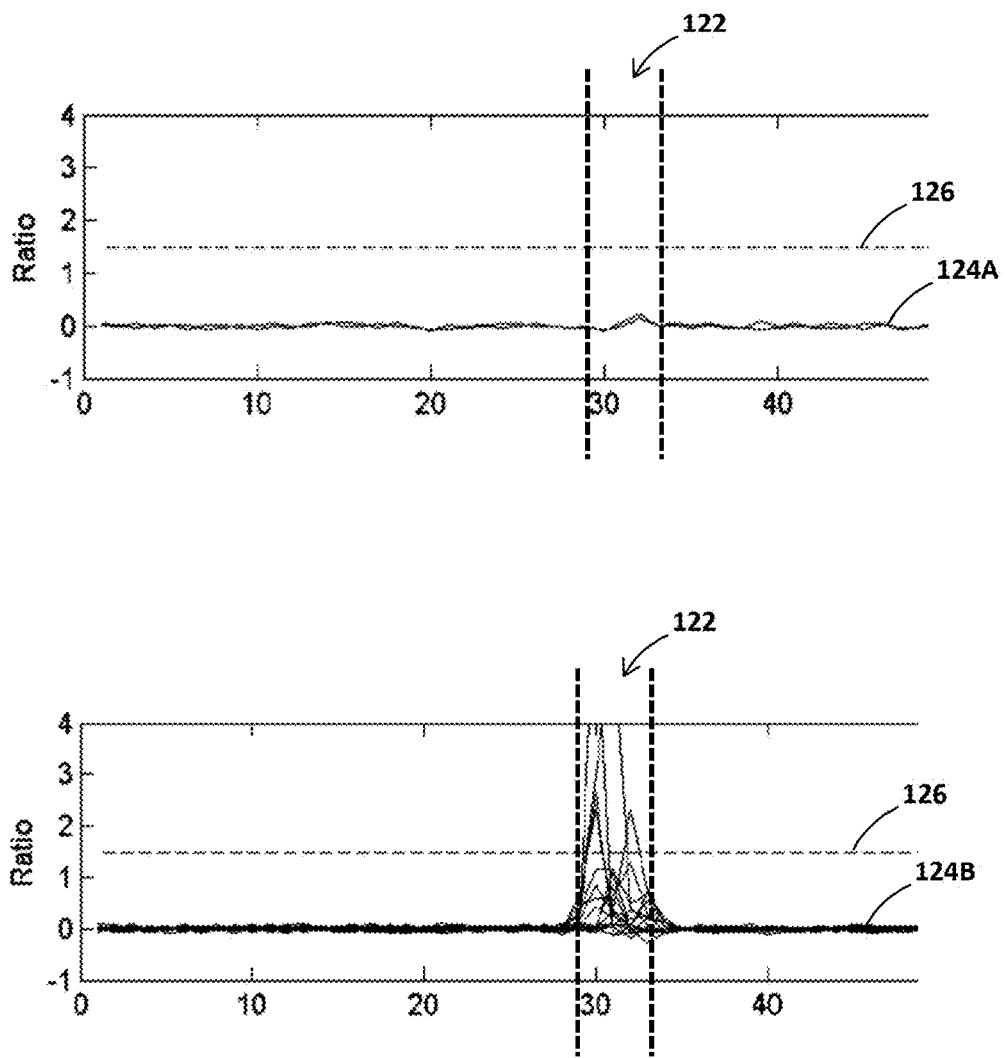
FIG. 1C is a graphical illustration of a ratio of magnitudes of at least two harmonics of the at least one waveform compared to a classification threshold, in accordance with an embodiment of the disclosure.

The computing system 104 is configured for determining a magnitude of each harmonic over the defect range 122. The computing system 104 is further configured for determining a ratio 124 of the magnitudes of the two harmonics. As illustrated in FIG. 1C, the computing system 104 is configured comparing the ratio 124 to a classification threshold 126 to classifying the detected defect. The classification threshold is a selected or predetermined value. In some embodiments, the classification threshold is related to the type of test medium 102. In some embodiments, the computing system is configured to classify the detected defect as a TA defect or a DLM defect based on whether the ratio 124 is less than or not less than the classification threshold 126. Classifying the defect utilizing the ratio 124 of the magnitudes of the two harmonics provides reliability advantages under high density and low SNR conditions.

In an embodiment, the computing system 104 is configured to determine the ratio 124 of the magnitude of the third harmonic of the waveform 120 over the magnitude of the first harmonic of the waveform 120. The computing system 104 is configured to classify the defect as a TA defect when the ratio 124A is less than the classification threshold 126. The computing system 104 is further configured to classify the defect as a DLM defect when the ratio 124B is not less than the classification threshold 126.

In another embodiment, the magnitude of the first harmonic and the third harmonic are determined in accordance with the following equation:

$$f_n = \sum_{k=0}^{7} x_{4T}(k) * \exp\left(\frac{-j*2\pi*n}{8}\right)$$

for n=1 and 3.

In the equation above, $f_n$ is a magnitude of the $n^{th}$ harmonic and $x_{4T}$ is the read back 4T waveform at time instant k. The ratio 124 of the magnitudes of the two harmonics is determined in accordance with the following equation: ratio=$f_3/f_1$. The foregoing equations are included to illustrate an embodiment of the disclosure and are not intended to limit the disclosure in any way.

Figure 2:
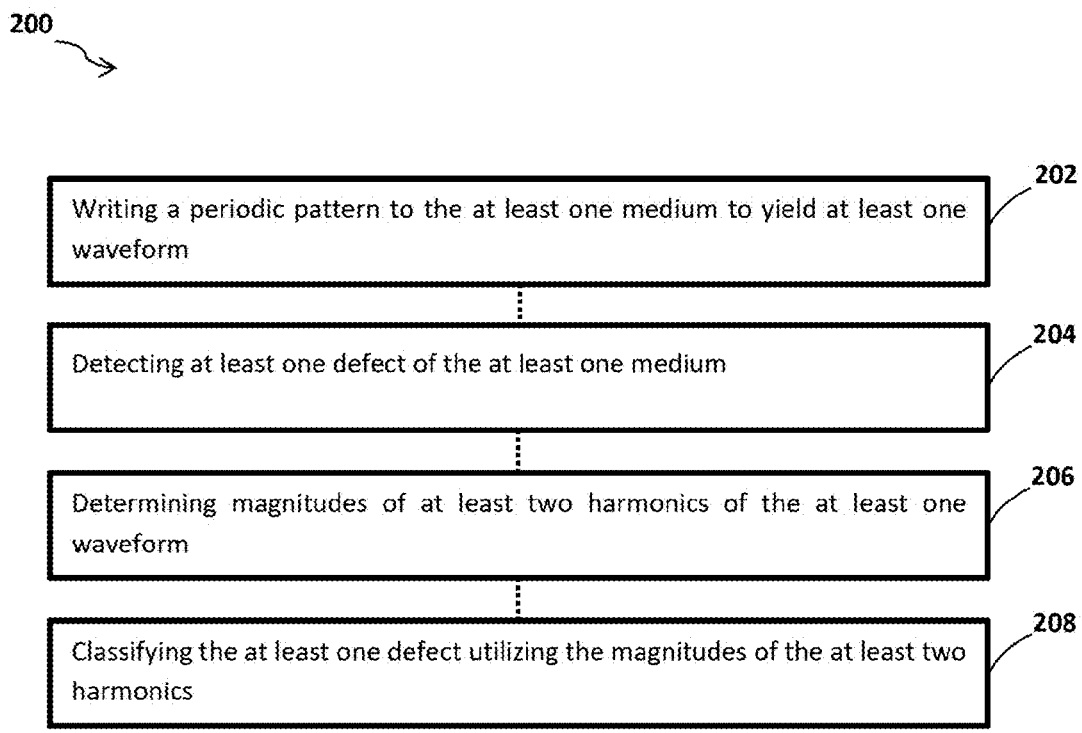
FIG. 2 is a flow diagram illustrating a method of detecting and classifying at least one media defect, in accordance with an embodiment of the disclosure.

FIG. 2 illustrates an embodiment of a method 200 of detecting and classifying at least one defect of the test medium 102. In some embodiments, method 200 is executed by one or more elements of system 100. However, the foregoing embodiments of system 100 should not be construed as limitations on method 200. It is contemplated that one or more of the following steps of method 200 can be executed by additional systems or devices known to the art.

At step 202, a periodic pattern is written to the test medium 102 to yield at least one waveform 120. In some embodiments, the periodic pattern includes a 4T pattern. At step 204, a magnitude of the waveform 120 is compared against a defect threshold to determine the presence or absence of a defect. In some embodiments, a defect is detected when the magnitude of the waveform 120 is less than the defect threshold. At step 206, magnitudes of at least two harmonics of the waveform 120 are determined over the defect range 122. In some embodiments, the two harmonics include a first harmonic of the waveform and a third harmonic of the waveform. At step 208, the defect is classified utilizing the magnitudes of the two harmonics. In some embodiments, a ratio 124 of the two harmonics is compared against a classification threshold 126 to determine the defect type. In some embodiments, the defect is classified as either a TA defect or a DLM defect based on whether the ratio 124 is less than the defect threshold 126 or not less than the defect threshold 126.

Figure 3:
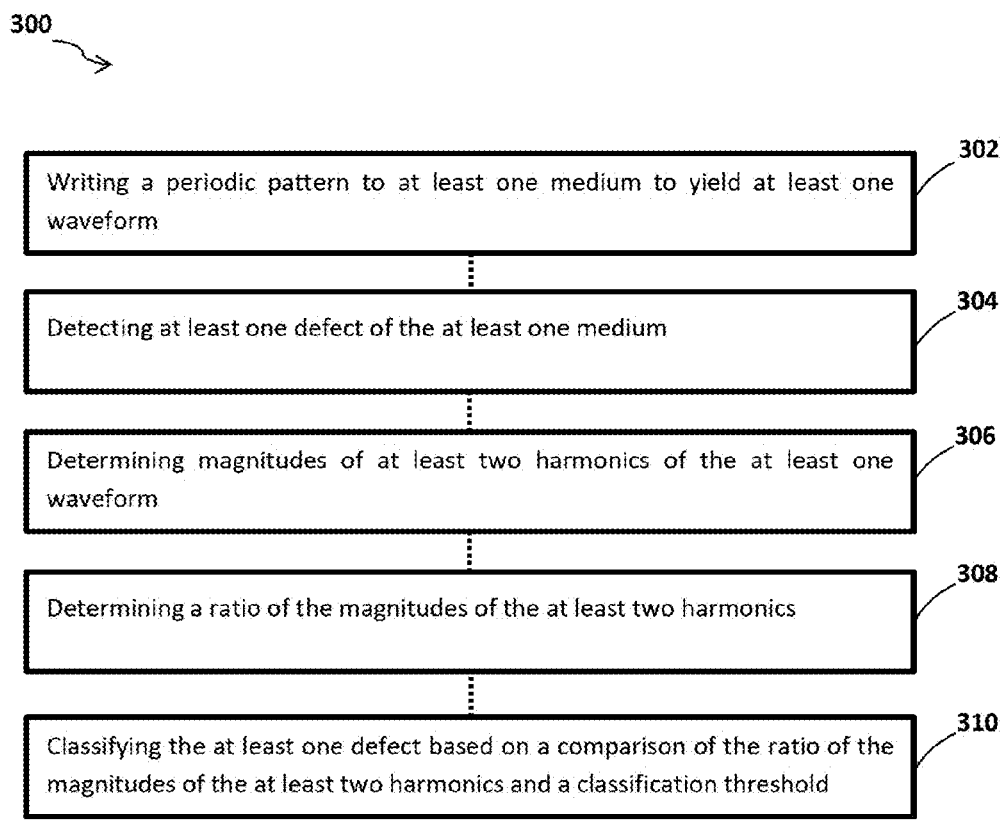
FIG. 3 is a flow diagram illustrating a method of detecting and classifying at least one media defect, in accordance with an embodiment of the disclosure.

Another embodiment of a method 300 for detecting and classifying at least one media defect is illustrated in FIG. 3. Any of the foregoing embodiments of method 200 similarly apply to method 300 unless otherwise noted. In some embodiments, method 300 is executed by one or more elements of system 100. However, the foregoing embodiments of system 100 or method 200 should not be construed as limitations on method 300. It is contemplated that one or more of the following steps of method 300 can be executed by additional systems or devices known to the art.

At step 302, a periodic pattern is written to the test medium 102 to yield at least one waveform 120. At step 304, a magnitude of the waveform 120 is compared against a defect threshold to determine the presence or absence of a defect. At least one defect is detected when the magnitude of the waveform 120 is less than the defect threshold. At step 306, magnitudes of at least two harmonics of the waveform 120 are determined over the defect range 122. At step 308, a ratio 124 of the magnitudes of the two harmonics is determined. At step 310, the defect is classified by comparing the ratio 124 of the magnitudes of the two harmonics and a classification threshold 126 to determine the defect type.

In an embodiment, the ratio 124 determined at step 308 includes a ratio of the magnitude of the third harmonic of the waveform and the magnitude of the first harmonic of the waveform (i.e. ratio=$f_3/f_1$). At step 310, the defect is classified as either a TA defect when the ratio 124A is less than the classification threshold 126 (i.e. ratio<ClassT). The defect is alternatively classified as a DLM defect when the ratio 124B is not less than the defect threshold 126 (i.e. ratio≥ClassT).

It should be recognized that in some embodiments the various steps described throughout the present disclosure may be carried out by a single computing system or multiple computing systems. A computing system may include, but is not limited to, a personal computing system, mainframe computing system, workstation, image computer, parallel processor, or any other device known in the art. In general, the term "computing system" is broadly defined to encompass any device having one or more processors, which execute instructions from a memory medium.

Program instructions implementing methods, such as those manifested by embodiments described herein, may be transmitted over or stored on carrier medium. The carrier medium may be a transmission medium, such as, but not limited to, a wire, cable, or wireless transmission link. The carrier medium may also include a storage medium such as, but not limited to, a read-only memory, a random access memory, a magnetic or optical disk, or a magnetic tape.

Embodiments manifesting methods described herein may include storing results in a storage medium. After the results have been stored, the results can be accessed in the storage medium and used by any of the method or system embodiments described herein, formatted for display to a user, used by another software module, method, or system, etc. Furthermore, the results may be stored "permanently," "semi-permanently," temporarily, or for some period of time. For example, the storage medium may be random access memory (RAM), and the results may not necessarily persist indefinitely in the storage medium.

It is further contemplated that any embodiment of the disclosure manifested above as a system or method may include at least a portion of any other embodiment described herein. Those having skill in the art will appreciate that there are various embodiments by which systems and methods described herein can be effected, and that the implementation will vary with the context in which an embodiment of the disclosure deployed.

Furthermore, it is to be understood that the invention is defined by the appended claims. Although embodiments of this invention have been illustrated, it is apparent that various modifications may be made by those skilled in the art without departing from the scope and spirit of the disclosure.

What is claimed is:

1. A system for detecting and classifying at least one media defect, comprising:
    a computing system in communication with at least one medium, the computing system configured for:
        writing a periodic pattern to the at least one medium to yield at least one waveform;
        detecting at least one defect of the at least one medium based on a comparison of a magnitude of the at least one waveform and a defect threshold;
        determining magnitudes of at least two harmonics of the at least one waveform;
        determining a ratio of the magnitudes of the at least two harmonics;
        classifying the at least one defect as a thermal asperity defect when the ratio of the magnitudes of the at least two harmonics is less than the classification threshold; and
        classifying the at least one defect as a delaminated defect when the ratio of the magnitudes of the at least two harmonics is not less than the classification threshold.

2. The system of claim 1, wherein the periodic pattern includes a 4T pattern.

3. The system of claim 1, wherein the at least two harmonics include a first harmonic of the at least one waveform and a third harmonic of the at least one waveform.

4. The system of claim 1, wherein the computing system is further configured for detecting the at least one defect when the magnitude of the at least one waveform is less than the defect threshold.

5. The system of claim 1, wherein the ratio of the magnitudes of the at least two harmonics includes a ratio of a magnitude of a third harmonic of the at least one waveform to a magnitude of a first harmonic of the at least one waveform.

6. A method of detecting and classifying at least one media defect, comprising:
   writing a periodic pattern to at least one medium to yield at least one waveform;
   detecting at least one defect of the at least one medium based on a comparison of a magnitude of the at least one waveform and a defect threshold;
   determining magnitudes of at least two harmonics of the at least one waveform;
   determining a ratio of the magnitudes of the at least two harmonics;
   classifying the at least one defect as a thermal asperity defect when the ratio of the magnitudes of the at least two harmonics is less than the classification threshold; and
   classifying the at least one defect as a delaminated defect when the ratio of the magnitudes of the at least two harmonics is not less than the classification threshold.

7. The method of claim 6, wherein the periodic pattern includes a 4T pattern.

8. The method of claim 6, wherein the at least two harmonics include a first harmonic of the at least one waveform and a third harmonic of the at least one waveform.

9. The method of claim 6, wherein the method further includes:
   detecting the at least one defect when the magnitude of the at least one waveform is less than the defect threshold.

10. A method of detecting and classifying at least one media defect, comprising:
    writing a periodic pattern to at least one medium to yield at least one waveform;
    detecting at least one defect of the at least one medium based on a comparison of a magnitude of the at least one waveform and a defect threshold;
    determining magnitudes of at least two harmonics of the at least one waveform, wherein the at least two harmonics include a first harmonic of the at least one waveform and a third harmonic of the at least one waveform;
    determining a ratio of the magnitudes of the at least two harmonics, wherein the ratio of the magnitudes of the at least two harmonics includes a ratio of a magnitude of the third harmonic to a magnitude of the first harmonic;
    classifying the at least one defect as a thermal asperity defect when the ratio of the magnitudes of the at least two harmonics is less than a classification threshold; and
    classifying the at least one defect as a delaminated defect when the ratio of the magnitudes of the at least two harmonics is not less than the classification threshold.

11. The method of claim 10, wherein the periodic pattern includes a 4T pattern.

12. The method of claim 10, wherein the method further includes:
    detecting the at least one defect when the magnitude of the at least one waveform is less than the defect threshold.

* * * * *